United States Patent Office 2,821,980
Patented Feb. 4, 1958

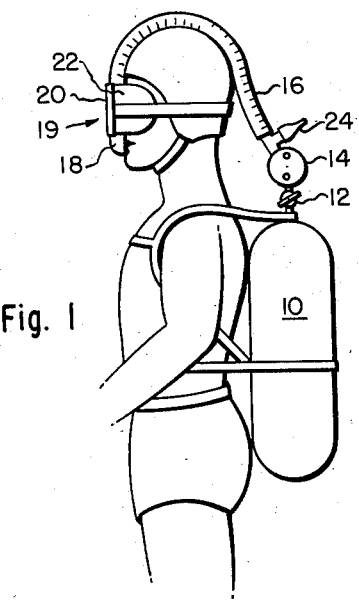
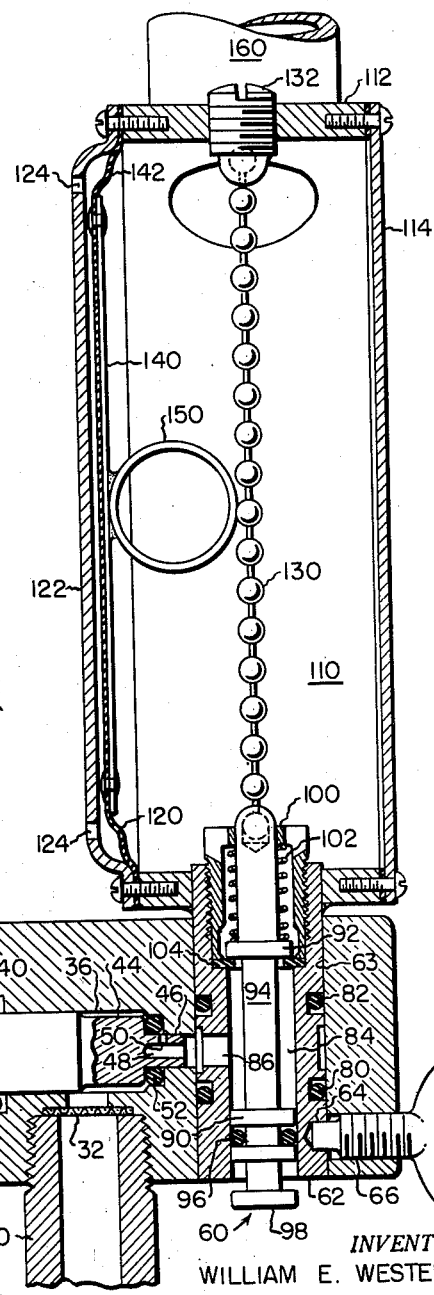
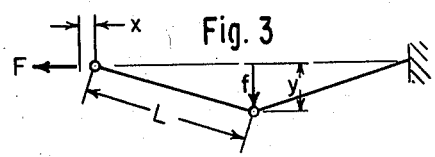
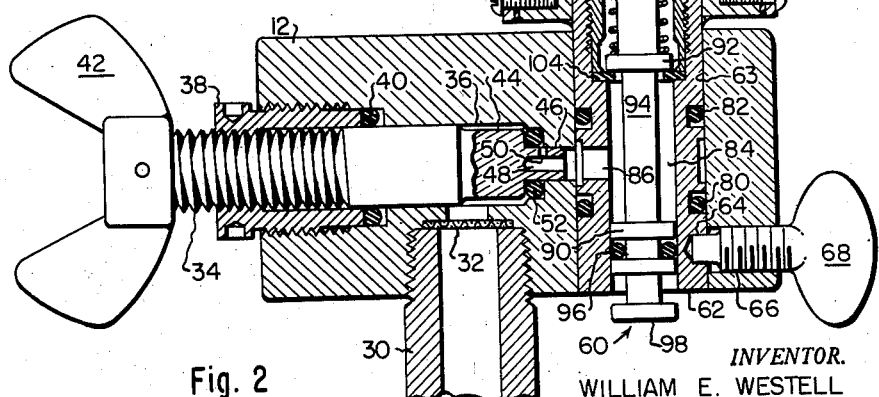
Fig. 1
Fig. 3
Fig. 2
*INVENTOR.*
WILLIAM E. WESTELL
BY Kenway Jenney Witter
+ Hildreth
ATTORNEYS

2,821,980

REGULATOR VALVE

William E. Westell, Dorchester, Mass.

Application April 4, 1955, Serial No. 498,912

12 Claims. (Cl. 128—142)

The subject invention relates to a fluid regulator valve and particularly to a demand-actuated respirator system for breathable gases which is adapted for use with diving apparatus.

Since the middle of the nineteenth century a number of types of apparatus of the design for use in diving wherein the breathable gas is supplied to the diver on demand at a pressure substantially equivalent to that of the water in which the diver is operating. In these systems utilizing a self-contained supply of breathable gas under very high pressures it is conventional to utilize a two-stage reducing valve. The first stage is a spring-loaded, diaphragm-operated valve which senses the pressure across the second stage, and which will reduce the high first-stage-supply pressure to an intermediate pressure, for example, 2000 pounds to 100 pounds. The second stage is a diaphragm-operated valve which senses the difference between the diver's internal lung pressure and environmental pressure at the diaphragm, thus supplying gas through suitable conduits to the diver's lungs upon demand.

This type of self-contained respiratory apparatus may optionally have a warning device consisting of a shut-off valve for the supply tank actuated by a spring-loaded diaphragm set to a predetermined warning pressure. The function of this type of warning device is to inform the diver that the gas supply is low by closing off the supply at a predetermined pressure after which the valve must be opened manually to permit the use of as much as possible of the remaining gas.

The above described type regulator has the disadvantage of being complex and expensive in that it requires the construction of two valves rather than one. In each valve all of the many component parts must function perfectly to insure the safety of the diver. Furthermore, it has a psychological disadvantage from the point of view of the user in that it requires a rather forcible inhalation in order to actuate the unbalanced valve. The result is a feeling on the part of the diver that he must pull the air out of the regulator, a sensation which causes fatigue and makes use of the apparatus unpleasant.

The pre-loaded warning valve which cuts off the supply at a given reduced supply pressure has an additional fundamental disadvantage. Some divers will utilize the breathable gas at a much larger rate of mass flow than others. In addition a given diver will breathe the same volume of dense air at great depth as he breathes of lighter air at the surface, and the mass rate of flow will therefore increase with depth. Since the warning valve shuts off at a given pressure (and this pressure is independent of mass rate of flow), some divers will get a longer supply period after a warning than others. Furthermore, the warning period will be shorter at greater depth than near the surface, whereas it should be a constant time or even more time at great depth.

It is the object of this invention to provide a regulator of improved, less complicated, more dependable, and less expensive construction than conventional regulators and which will be capable of supplying an adequate volume of breathable gas utilizing a very wide range of supply pressures.

It is an additional object of this invention to provide a respirator system incorporating a warning mechanism which is sensitive to the mass flow of the gas rather than simply the supply pressure.

It is a feature of this invention that it utilizes a square law linkage to connect the regulator diaphragm to the regulator valve. In such a linkage the valve motion is proportional to the square of the diaphragm motion. The movement of the diaphragm is, of course, directly proportional to the pressure across it. Therefore the amount of valve opening is proportional to the square of the pressure across the regulator valve. This variable mechanical advantage provides maximum sensitivity and the highest mechanical advantage just as the valve is cracked in comparison with when the valve is fully opened. This feature in turn makes for easier breathing at high supply pressures since in most valves the force necessary to open the valve is to some degree a function of supply pressure. This linkage also provides a fundamentally more stable system since it provides better control of valve displacement over the range of small openings experienced at high supply pressures. An additional advantage of the square law linkage is the fact that it makes breathing seem easier. Doubling the breathing pressure and therefore the diaphragm displacement results in quadrupling the valve displacement and therefore quadrupling the flow.

Another feature of this invention is the fact that it utilizes a statically balanced valve member. In addition to facilitating the operation of the regulator over a wide range of supply pressures, this balanced construction can be modified to provide a slight but controllable amount of differential force tending to close the valve, said force being a function of the supply pressure. Since the linkage described herein provides a maximum mechanical advantage at high supply pressures (small openings) these two effects work together to increase the stability of the valve while maintaining ease of operation for the valve.

An additional feature of the balance construction of this valve is the fact that it permits direct manual opening of the valve in case of emergency.

An additional advantage of this device is the fact that the warning mechanism which is dependent upon mass flow will provide a warning at a set period of time before the tank is empty regardless of whether the user is in shallow water or at great depth and also regardless of whether the user is breathing rapidly or slowly. Since the warning in this device occurs as a feeling of constriction in the supply it is possible to increase the warning time by taking a very sudden deep breath which greatly increases the demand rate and therefore the mass flow. Other features of this apparatus will appear from the description which follows.

In the drawings, Fig. 1 represents a side view of a diver carrying a typical self-contained gas supply system of the type contemplated in this invention, Fig. 2 is a sectional elevation through the supply valve and regulator valve of this invention, and Fig. 3 represents a schematic view of the valve linkage.

As shown in Fig. 1, a supply tank 10 containing compressed air at a pressure of perhaps 2000 pounds feeds through a supply valve 12 to the demand valve regulator 14. The outlet from the regulator 14 leads through the flexible supply hose 16 to a breathing device 18 shown as a mouthpiece. A conventional face mask 19 having a transparent face plate 20 and a rubberized face conforming mask 22 which carries the face plate and forms a seal around the contours of the face is also shown.

In the system as illustrated an exhalation flapper valve 24 is carried on the flexible supply tube 16 in a position closely adjacent to the flexible diaphragm of the demand regulator. However, it will be apparent that the supply means to the diver illustrated here can be varied in a number of ways.

Alternative conventional embodiments include an open circuit system in which a return tube leads back to a flapper valve near the diaphragm and the return and supply tubes both lead from a mouthpiece. Also, the air could be fed to the mask, or to a mask covering the mouth as well as the nose. These various methods of actually feeding the breathable gas to the user constitute merely a matter of choice and the regulator valve of this invention may obviously be used with any of them or in fact with any system in which a fluid under pressure is to be released on demand.

As illustrated by reference to Fig. 2, supply pipe 30 leads from the supply tank 10 (Fig. 1) to the shut-off valve body 12. The supply pipe is threaded to the valve body and a screen 32 is carried in the cavity between the end of the supply pipe and the valve body. The valve member 34 is in the form of a cylindrical plunger fitted to a cylindrical cavity 36 in the valve body. A nut 38 threaded to the valve body and to the cylindrical valve member serves as a guide for valve member and also to position the O-ring 40 which seals the outer periphery of the valve member. The wing nut 42 locks to the end of the valve member and facilitates manual operation. The end of the valve carries a reduced section 44 and the valve tip is in the form of a nipple 46 fitted to a cylindrical hole in the end of the chamber 36. The inside of the nipple is counterbored to provide the cavity 48 and a small restrictive orifice 50 is drilled through the side of the nipple 46 to communicate with the cavity 48. The O-ring 52 is carried in the end of the cylinder 36 and is shown in the closed position around the nipple 46.

The regulator valve is in the form of a balanced spool 60 fitted to a regulator valve sleeve 62. This valve sleeve is cylindrical in form and fitted to a cylindrical bore 63 which extends through the supply valve body 12. The sleeve carries a recess 64, and the supply valve body has a threaded hole tapped into the side in registration with the recess in the regulator valve sleeve. A thumb screw 68 in the threaded bore 66 extends into the recess in the valve sleeve and locks it in position. The above construction avoids any tendency for the supply pressure to force the regulator and valve body apart. Furthermore, filling of the tanks is facilitated by the use of a yoke which also fits into the bore in the valve body 12.

The two O-rings 80 and 82 are carried in channels about the periphery of the valve sleeve seal against the bore in the valve body 12 to prevent leakage of gas. The cylindrical cavity 84 extends along the axis of the sleeve and is in communication with the orifice 50 through the hole 86 in the valve sleeve.

The valve spool 60 carries the two flanges 90 and 92 extending outwardly from the central shaft 94. These flanges, containing the gas under pressure, form in effect a statically balanced piston or spool fitted to the cylinder 84 in the valve sleeve. The flange 90 carries the O-ring sealing member 96 and the shaft 94 extends beyond this flange to form the butt 98 by which manual operation of the valve is effected. It will be noted that if the effective area of flange 90 is larger than that of flange 92 there will be a force tending to close the valve which is a function of pressure.

The other end of the valve cylinder carries an enlarged threaded bore into which is fitted the spring retaining nut 100 which holds the spring 102 in compression against the outer shoulder of the flange 92. The nut 100 also positions the cylindrical valve seat 104 preferably a compressed resilient material. Under the influence of the spring the flange 92 will seat against the washer 104.

Upon opening of the valve a port or valve orifice will be created between these two surfaces.

The upper end of the retaining nut 100 is perforated to permit the passage of gas into the regulator chamber 110. This chamber is formed of a cylindrical housing 112, an end plate 114 which is fastened to one end of the cylinder, and a flexible diaphragm 120 which is fastened to the other end of the cylinder.

The diaphragm cover plate 122 is fastened over the diaphragm and seals the diaphragm tightly to the cylindrical end of the housing 112. Restrictive openings 124 are drilled in the cover plate to admit the surrounding medium to the outside of the flexible diaphragm.

A flexible linkage 130, preferably in the form of a beaded chain as shown is fastened at one end to the end of the valve spool 60 and the other to the threaded bolt 132 extending through the cylindrical housing. Tension on the linkage 130 is adjusted by a rotation of this bolt 132.

The inner surface of the flexible diaphragm 120 carries a stiffener 140 which is somewhat smaller in diameter than the cylindrical housing and which is connected to the end of the housing by means of the bellows portion 142 of the diaphragm. A substantially rigid cylinder 150 having a diameter equal to the normal spacing between the flexible diaphragm and the linkage 130 is fastened to the diaphragm but not the linkage and serves to transmit inward motion of the diaphragm to the linkage. A breather tube outlet 160 serves to carry the gas from the regulator chamber to the breather tube 16.

The above described apparatus function as follows. Gas is supplied from the supply tank 10 through the pipe 30 and the screen 32 into the space formed between the wall of the chamber 36 and the reduced section 44 of the valve member 34. When the valve member is in the position shown, flow is blocked by the O-ring 52. However, if the valve member 34 is turned sufficiently to bring the orifice 50 out beyond the O-ring 52, flow will take place through this orifice 50 into the counterbored cavity 48 in the valve member. This orifice 50 is in communication through the opening 86 in the side of the valve cylinder 62 with the chamber 84 extending along the axis of the valve sleeve 62 and sealed by the flanges 90 and 92 on the spool 60. These flanges produce a balanced valve spool since the force of this high pressure of gas will push equally in both directions along the axis of the spool. However, if the pressure in the regulator cavity 110 is decreased a fraction of a pound by an inward respiration of the user, the diaphragm 120 will tend to move inward. The rigid tube 150 will deflect the flexible link 130 whereby tending to pull the flange 92 up off of the valve seat 104. This will open the port permitting flow into the regulator chamber 110 until such time as the pressures are again equalized and the spring 102 reseats the valve flange 92. Should the valve spool 94 tend to stick a very valuable characteristic of this construction is the fact that the spool extends outwardly beyond the sleeve 62 and carries a button 98 which may be pressed thereby opening the valve orifice and permitting flow regardless of the diaphragm position.

The orifice area in this device is proportional to the square of the pressure across the regulator diaphragm. It will be readily apparent that the deflection of the linkage in a direction perpendicular to the diaphragm will be very much larger than the distance which the valve stem will move and it may be shown that the motion of the valve stem will be proportional for small angles to the square of the deflection of the diaphragm. It is this fact that makes it possible for a relatively small demand pressure differential to actuate this valve in an easy and satisfactory manner over very wide variations of supply pressures.

While this construction permits stable operation over an unusually wide range of pressures, it may under some circumstances be desirable to provide damping. This is done by means of the diaphragm cover 122 together with the restricting port 124 which admit the surrounding fluid to the outer surface of the diaphragm. If the diaphragm cover is placed sufficiently close to the outer surface of the diaphragm, it will have a damping effect regardless of the restrictive orifice 124. The addition of the controlled flow by the restrictive orifice 124 provides a satisfactory damping over a wide range of diaphragm motions. This restriction orifice is preferably of the order of .2% of the diaphragm area and in any event less than 2% of the diaphragm area for effective damping.

The operation of the warning valve in the above-described system is as follows. The valve stem 34 is shown in the closed position so that the orifice 50 is sealed off by the O-ring 52. If the wing nut 40 is utilized to back the valve stem away from the valve seat sufficiently so that the orifice 50 clears the O-ring 52 the chamber 84 in the valve sleeve 62 will be open through the passage 86 and the orifice 50 to the supply tank. The supply tank 10 is constantly in communication through the pipe 30 and screen 32 with the cavity 36.

The resistance of the orifice 50 to flow through it will depend on the mass rate of flow which is a function of density (i. e. pressure) and velocity. A user who is breathing air rapidly will therefore experience a slight resistance in the supply at a higher supply pressure than will somebody whose demand rate is low. Since it is the purpose of this restrictive orifice to give warning that only a small amount of time remains before the supply will be exhausted, the characteristics of this warning orifice are very useful. When the demand rate is high the orifice will restrict at a higher supply pressure. However, since the supply is being used up at a more rapid rate the amount of time that this supply will last is substantially a constant when compared with the low demand rate user who experiences a warning constriction at a lower pressure. Thus the restrictive orifice, instead of giving a warning when the supply pressure is down to a specific point as do most warning valves, gives warning that the user has a certain amount of time at the rate at which he is using the gas before the gas will give out. The time is also independent of density changes due to depth variations.

When this constrictive feeling is experienced the wing nut 42 is turned thereby withdrawing the valve stem 34 until the entire nipple 46 clears the O-ring 52. This presents a clear and open passage with no restrictions between the supply tank 10 and the chamber 84 in the spool valve. It is then possible to use the gas in the supply tank until the tank pressure is down to the pressure of the surrounding medium on the outside of the diaphragm.

The construction of the valve spool 94 is balanced so that the outward force due to the difference in the supply pressure and the surrounding medium against flange 90 is approximately equal to the outward force against flange 92 toward the regulator.

In addition, the effective area of the flange 90 may be made slightly larger than that of flange 92 in order to provide a closing force which is a function of supply pressure. The spring 102 provides an essentially constant force tending to close the valve. The net force tending to close the valve at any given pressure must be overcome by the diaphragm and linkage.

While this balanced valve construction provides obvious advantages, the principle of square law linkage can be very successfully applied to an unbalanced valve, and the illustrated construction is merely a preferred embodiment. In addition, it facilitates actuating means for the valve by extending the valve spool.

The theory of operation for the above square law valve may be better understood by reference to Fig. 3. It will be immediately apparent that the diaphragm deflection which is indicated by the letter $y$ will, for small angles, very greatly exceed the valve opening $x$. As indicated above it may be shown that for small motions the mechanical advantage follows a square law relationship. The force $f$ is a product of the effective diaphragm area times the difference in pressure between the surrounding medium and the slightly decreased pressure inside the regulator when a breath is drawn. The force tending to close the valve is primarily the constant force of the spring 102, although a small intentional unbalance in the valve spool may be used to provide an additional closing force which is proportional to the supply pressure. These are static forces in effect when the valve is closed. However, the mass rate of flow when the valve is open is so small that the tendency of flow forces to close the valve may be neglected. The closing force in a balanced valve may thus be considered a constant F. For small angles of deflection $x$ may be shown to be proportioned to $f^2/F^2$. Since F is nearly constant, doubling the breathing pressure will quadruple the valve opening $x$. The amount of flow which is needed from the regulator is dictated by the demands of the respiratory system, and as the supply pressure $P_s$ decreases the square law relationship makes it easier to obtain an adequate flow of breathable gas.

An alternative way of looking at this geometry is to say that $y \simeq \sqrt{xL}$. Where L is equal to 3 inches and $y$ is less than ¼ inch the square law approximation is accurate to within less than 1% error. Utilizing a test model having these dimensions the maximum valve opening was found to be .04 inch. For an actuating pressure of .5 p. s. i. the above orifice supplied a volumetric flow of .1 cu. ft. per second when the supply pressure was twice that of the environment. It may be seen that the orifice is extremely small and the flow velocity very high, being sonic for pressures existing during 95% of the time if the original supply pressure is 2000 pounds. However, even when the supply pressure is greatly reduced adequate flow still will be obtained. The normal required flow to satisfy the lungs is .02 cu. ft. per second, and this was achieved with a lung actuating pressure of .7 p. s. i. when the supply pressure in the tank had fallen to the level of that of the surrounding liquid medium. It is therefore possible with this type of actuating device to completely utilize the breathable gas stored in the tank.

It may be desirable in some cases to provide some additional damping in order to maintain stability in this regulator. The necessary damping may be most easily obtained by perforating the cover plate over the diaphragm in such a manner to provide a resistive loading to the flow through these orifices to the diaphragm. It has been found that an effective compromise which supplies suitable damping over a wide range of supply pressures is achieved by utilizing an orifice area approximately ½ of 1% of the diaphragm area.

While the above valve construction has been described with respect to a single embodiment it will be apparent that many modifications of the actual construction may be made without departing from the invention which is to be limited only by the following claims.

I claim:

1. A fluid regulator comprising a housing, a flexible diaphragm fitted to said housing separating an inner chamber from the surrounding medium, a high pressure fluid supply means for the inner chamber, a valve means for the supply means, a flexible linkage attached to the valve means and extending in a substantially straight line, means anchoring the end of the linkage, a demand outlet line from the inner chamber, and means for utilizing inward motion of the diaphragm to bend the linkage thereby shortening the length of the linkage and tending to open the valve.

2. A regulator as described in claim 1 comprising in addition damping means for the diaphragm.

3. A regulator as in claim 1 having in addition a diaphragm cover parallel to and closely adjacent to the outside surface of the diaphragm.

4. A regulator as described in claim 1 having in addition a diaphragm cover, and restricted fluid communication means connecting the diaphragm with the surrounding medium and tending to damp diaphragm oscillations.

5. A regulator as in claim 1 having in addition manual actuation means for the valve.

6. A regulator as in claim 1 having in addition means for adjusting the displacement between the valve member and the linkage anchor position.

7. A regulator as in claim 1 wherein the valve means comprises a sleeve, a substantially balanced spool member fitted to the sleeve and having a reduced center section forming a chamber sealed by two flanges, fluid inlet means to the chamber, a valve seat for the valving flange and spring loading means tending to force the valving flange against the seat whereby the linkage is fastened to the spool and acts to move the valve flange away from the seat.

8. A breathing apparatus comprising a source of breathable gas, valve means for the source, said apparatus having a breathing tube outlet, and a demand valve regulator connecting the source valve with the breathing tube outlet comprising a regulator body having a chamber, a diaphragm sealing the chamber from the surrounding medium, a valving member, a linkage substantially parallel to the diaphragm fixed at one end to the regulator body and at the other to the valving member, and means transmitting inward motion of the diaphragm to the linkage whereby reduction of pressure in the chamber will bend the linkage and open the valve.

9. A breathing apparatus as in claim 8 wherein the valve means for the source comprises a valve member fitted to a valve body and capable of assuming open, closed, and restricted flow positions whereby the restricted flow position permits flow through an orifice of predetermined size.

10. A breathing apparatus comprising a source of breathable gas, said apparatus having a breathing tube outlet, a demand operated regulator valve to supply the breathing tube outlet, a supply valve connecting the supply to the regulator, and a resistive orifice between the supply and the demand operated regulator valve whereby the orifice will provide a low supply warning by providing a restriction against the gas flow which is a function of the rate of gas consumption.

11. A fluid regulator comprising a housing having an opening, a flexible diaphragm fitted to the opening and separating a chamber from the surrounding medium, a demand outlet from the chamber, high pressure fluid supply means for the chamber, a valve for the supply means, and a square law linkage connecting the diaphragm to the valve whereby inward displacement of the diaphragm displaces the valve by an amount which is substantially proportional to the square of the diaphragm displacement.

12. A breathing apparatus comprising a source of breathable gas, said apparatus having a breathing tube outlet, a demand operated regulator valve to supply the breathing tube outlet, a supply valve connecting the supply to the regulator, a resistive orifice between the supply and the demand operated regulator to supply a low supply warning by restricting gas flow as a function of the rate of gas consumption, and control means for by-passing the restrictive orifice to provide unrestricted supply to the regulator valve following low supply warning.

References Cited in the file of this patent
UNITED STATES PATENTS 1,540,439 Thrall _____ June 2, 1925